United States Patent
Khurshudov et al.

(10) Patent No.: US 7,484,082 B2
(45) Date of Patent: Jan. 27, 2009

(54) METHOD AND APPARATUS FOR MULTIPLE BOOT ENVIRONMENTS WITHIN A HARD DISK DRIVE

(75) Inventors: Andrei Khurshudov, San Jose, CA (US); Debasis Baral, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 267 days.

(21) Appl. No.: 10/993,508

(22) Filed: Nov. 18, 2004

(65) Prior Publication Data

US 2006/0107029 A1    May 18, 2006

(51) Int. Cl.
*G06F 9/00* (2006.01)
(52) U.S. Cl. .............................. 713/1; 713/2
(58) Field of Classification Search ............... 713/1, 713/2
See application file for complete search history.

(56) References Cited

U.S. PATENT DOCUMENTS

| | | | | |
|---|---|---|---|---|
| 5,136,711 A | * | 8/1992 | Hugard et al. | 713/2 |
| 6,385,721 B1 | * | 5/2002 | Puckette | 713/2 |
| 6,430,663 B1 | * | 8/2002 | Ding | 711/162 |
| 6,542,979 B1 | * | 4/2003 | Eckardt | 711/173 |
| 7,024,549 B1 | * | 4/2006 | Luu et al. | 713/2 |
| 7,046,467 B1 | * | 5/2006 | Chheda | 360/51 |
| 2002/0162444 A1 | * | 11/2002 | Yu et al. | 84/601 |
| 2003/0051110 A1 | * | 3/2003 | Gaspard et al. | 711/162 |

* cited by examiner

*Primary Examiner*—Thomas Lee
*Assistant Examiner*—Vincent T Tran
(74) *Attorney, Agent, or Firm*—GSS Law Group; Earle Jennings

(57) ABSTRACT

This invention includes a method providing at least two boot environments with only one hard disk drive, by using at least two disk surfaces within the hard disk drive. The invention includes the hard disk drives implementing the method. The hard disk drive may include more than two disk surfaces and support more than two boot environments. The invention includes making the hard disk drive, and the product of that process. The invention includes computer systems including at least one of these hard disk drives. The invention also includes removable storage systems which include at least one hard disk drive, and which may communicate via a wireline and/or wireless physical transport with a computer system.

18 Claims, 8 Drawing Sheets

METHOD AND APPARATUS FOR MULTIPLE BOOT ENVIRONMENTS WITHIN A HARD DISK DRIVE

TECHNICAL FIELD

The invention relates to the operation of hard disk drives. More particularly, the invention relates to using multiple disk surfaces to provide a multiple boot environment within a hard disk drive.

BACKGROUND OF THE INVENTION

Prior art hard disk drive users have problems, which are not easily solved. One problem facing many computer users has to do with the need to use the capabilities of more than one operating system. For example, a user may develop simulations using Linux or BSD Unix, but run spreadsheets, word processors, and presentation development software under some version of Windows. Typically, this requires two computers, because almost all operating systems demand ownership of the boot disk drive. However, there is exactly one hard disk drive in a personal computer that is looked at first upon booting up the computer. What is needed is a way to boot more than one operating system from the same hard disk drive.

SUMMARY OF THE INVENTION

The present invention includes a method providing at least two boot environments with only one hard disk drive, by using at least two disk surfaces within the hard disk drive. The invention includes the hard disk drives implementing the method, and may include more than two disk surfaces and support more than two boot environments.

The invention's method includes the following operations. Accessing a first disk surface and hiding a second disk surface when the disk-purpose is the first-boot-environment. Accessing the second disk surface and hiding the first disk surface when the disk-purpose is the second-boot-environment.

The invention includes making the hard disk drive, and the product of that process. The invention includes computer systems including at least one of these hard disk drives. The invention also includes removable storage systems which include at least one hard disk drive, and which may communicate via a wireline and/or wireless physical transport with a computer system.

DETAILED DESCRIPTION

The present invention includes a method providing at least two boot environments with only one hard disk drive, by using at least two disk surfaces within the hard disk drive. The invention includes the hard disk drives implementing the method, and may include more than two disk surfaces and support more than two boot environments.

Figure 1A:
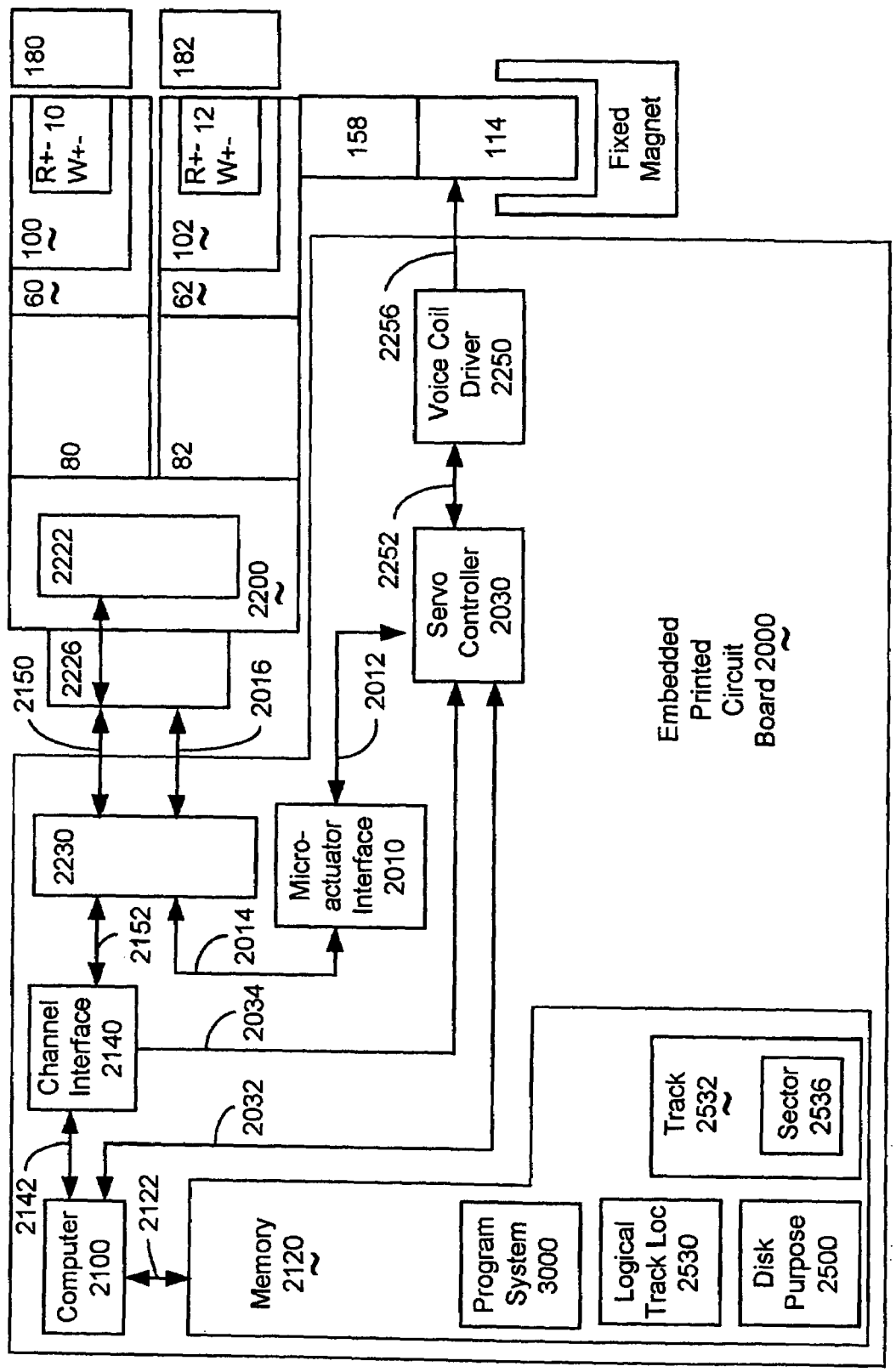
FIG. 1A shows a simplified schematic of a hard disk drive in accord with the invention.

The invention's method may preferably be implemented in the hard disk drive 1000 as shown in a simplified block diagram in FIG. 1A. This hard disk drive includes an embedded printed circuit board 2000. The components of a voice coil actuator 118, and possibly a micro-actuator assembly 200, position the read-write head 10 over a first disk surface 180. The read-write head accesses the first disk surface to read and write data. This embedded printed circuit board is shown preferably including at least one computer 2100, at least one channel interface 2140, at least one micro-actuator interface 2010, a servo-controller 2030 and a voice coil driver 2250. Overall operation of the hard disk drive is typically directed by the program system 3000, that includes program steps residing in a memory 2120. This memory is accessibly coupled 2122 to the computer.

Some of the following figures show flowcharts of at least one method of the invention, which may include arrows with reference numbers. These arrows signify a flow of control, and sometimes data, supporting various implementations of the method. These include at least one the following: a program operation, or program thread, executing upon a computer; an inferential link in an inferential engine; a state transition in a finite state machine; and/or a dominant learned response within a neural network.

The operation of starting a flowchart refers to at least one of the following. Entering a subroutine or a macro instruction sequence in a computer. Entering into a deeper node of an inferential graph. Directing a state transition in a finite state machine, possibly while pushing a return state. And triggering a collection of neurons in a neural network. The operation of starting a flowchart is denoted by an oval with the word "Start" in it.

The operation of termination in a flowchart refers to at least one or more of the following. The completion of those operations, which may result in a subroutine return, traversal of a higher node in an inferential graph, popping of a previously stored state in a finite state machine, return to dormancy of the firing neurons of the neural network. The operation of terminating a flowchart is denoted by an oval with the word "Exit" in it.

A computer as used herein will include, but is not limited to, an instruction processor. The instruction processor includes at least one instruction processing element and at least one data processing element. Each data processing element is controlled by at least one instruction processing element.

Figure 2A:
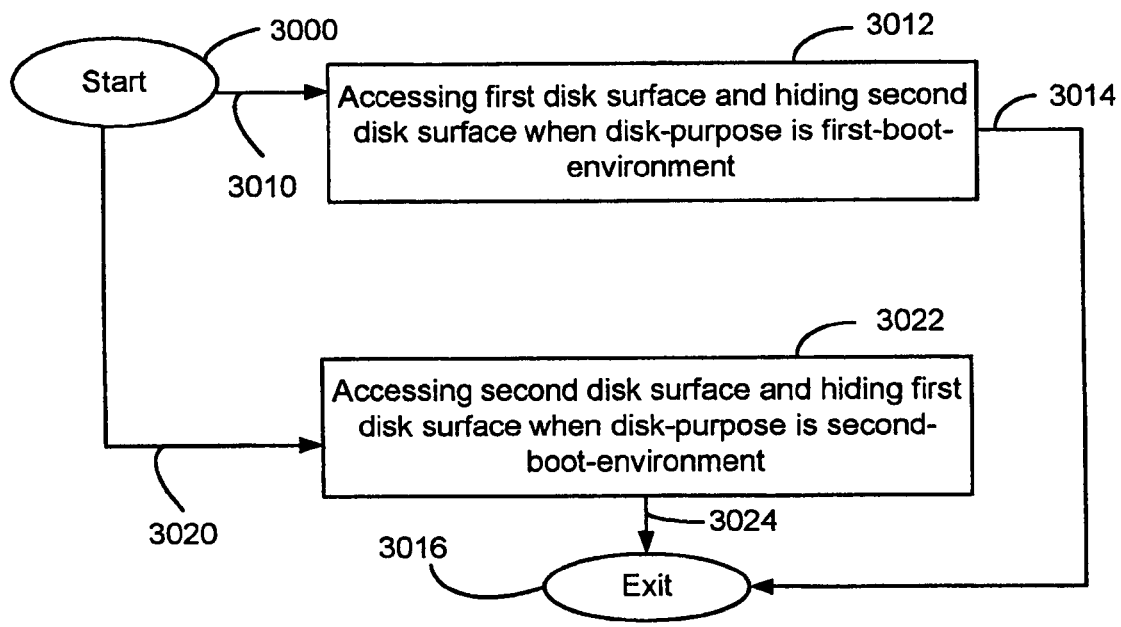
FIG. 2A shows a detail flowchart of the program system of FIG. 1A.

This invention's method includes the following operations. Accessing a first disk surface and hiding a second disk surface when the disk-purpose is the first-boot-environment. Accessing the second disk surface and hiding the first disk surface when the disk-purpose is the second-boot-environment. FIG. 2A shows a detail flowchart of the program system 3000 of FIG. 1A supporting using the first disk surface 180 and the second disk surface 182 in multiple boot environments. Operation 3012 supports accessing the first disk surface and hiding the second disk surface when the disk-purpose 2500 is a first-boot-environment 2516. Operation 3022 supports accessing the second disk surface and hiding the first disk surface when the disk-purpose 2500 is a second-boot-environment 2518.

Table 1 shows use of the hard disk drive 1000 containing the first disk surface 180 and the second disk surface 182, when the disk-purpose 2500 is set to the first-boot-environment 2516 or to the second-boot-environment 2518.

TABLE 1

Operation of a dual disk surface, hard disk drive in accord with the invention.

| Disk Surface | Disk-purpose 2500 | |
| --- | --- | --- |
| | First-boot-environment 2516 | Second-boot-environment 2518 |
| First disk surface 180 | Accessible | Hidden |
| Second disk surface 182 | Hidden | Accessible |

Figure 1B:
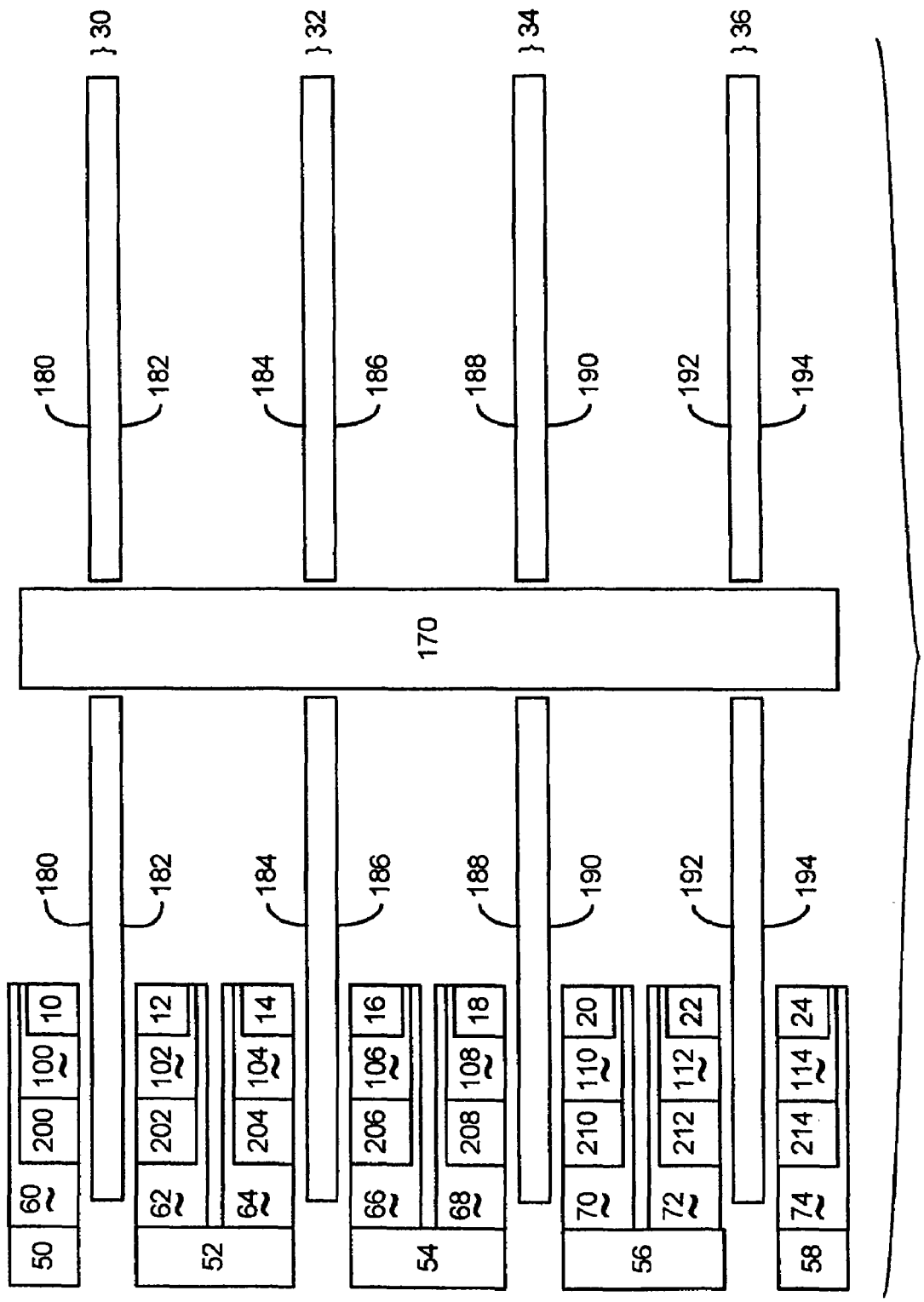
FIG. 1B shows the hard disk drive of FIG. 1A including more than a first disk.

The hard disk drive 1000 of FIG. 1A may include more than a first disk 30, providing more than the two disk surfaces, as shown in FIG. 1B. The hard disk drive may preferably include a second disk 32, which may provide a third disk surface 184 and a fourth disk surface 186. The hard disk drive may preferably include a third disk 34, which may provide a fifth disk surface 188 and a sixth disk surface 190. The hard disk drive may preferably include a fourth disk 36, which may provide a seventh disk surface 192 and an eighth disk surface 194. The hard disk drive may include more than four disks. While this discussion will restrict itself to hard disk drives including up to four disks, aspects of the invention may include more than four disks.

Table 2 shows use of a first allocation of four disk surfaces of the hard disk drive 1000, when the disk-purpose 2500 is set to the first-boot-environment 2516 or to the second-boot-environment 2518.

TABLE 2

Operation of a first allocation of four disk surfaces in the hard disk drive.

| Disk surface | Disk-purpose 2500 | |
| --- | --- | --- |
| | First-boot-environment 2516 | Second-boot-environment 2518 |
| First disk surface 180 | Accessible | Hidden |
| Second disk surface 182 | Hidden | Accessible |
| Third disk surface 184 | Accessible | Hidden |
| Fourth disk surface 186 | Hidden | Accessible |

Table 3 shows use of a second allocation of four disk surfaces of the hard disk drive 1000, when the disk-purpose 2500 is set to the first-boot-environment 2516 or to the second-boot-environment 2518.

TABLE 3

Operation of a second allocation of four disk surfaces in the hard disk drive.

| Disk surface | Disk-purpose 2500 | |
| --- | --- | --- |
| | First-boot-environment 2516 | Second-boot-environment 2518 |
| First disk surface 180 | Accessible | Hidden |
| Second disk surface 182 | Accessible | Hidden |
| Third disk surface 184 | Hidden | Accessible |
| Fourth disk surface 186 | Hidden | Accessible |

Table 4 shows use of a third allocation of four disk surfaces of the hard disk drive 1000, when the disk-purpose 2500 is set to the first-boot-environment 2516 or to the second-boot-environment 2518. In this third allocation, the first-boot-environment 2516 is allocated a different number of disk surfaces than the second-boot-environment 2518.

TABLE 4

Operation of a third allocation of four disk surfaces in the hard disk drive.

| Disk surface | Disk-purpose 2500 | |
| --- | --- | --- |
| | First-boot-environment 2516 | Second-boot-environment 2518 |
| First disk surface 180 | Accessible | Hidden |
| Second disk surface 182 | Accessible | Hidden |
| Third disk surface 184 | Accessible | Hidden |
| Fourth disk surface 186 | Hidden | Accessible |

One way to implement the operations of accessing and hiding found in operation 3012 of FIG. 2A, is shown in FIGS. 2B to 3B. A second, essentially equivalent, way to implement the operations of accessing and hiding found in operation 3022 of FIG. 2A, is shown in FIGS. 4A and 4B. Either way and/or any of their equivalents may be embodied by implementations of the invention's method, and are within the scope of the claims.

Figure 2B:
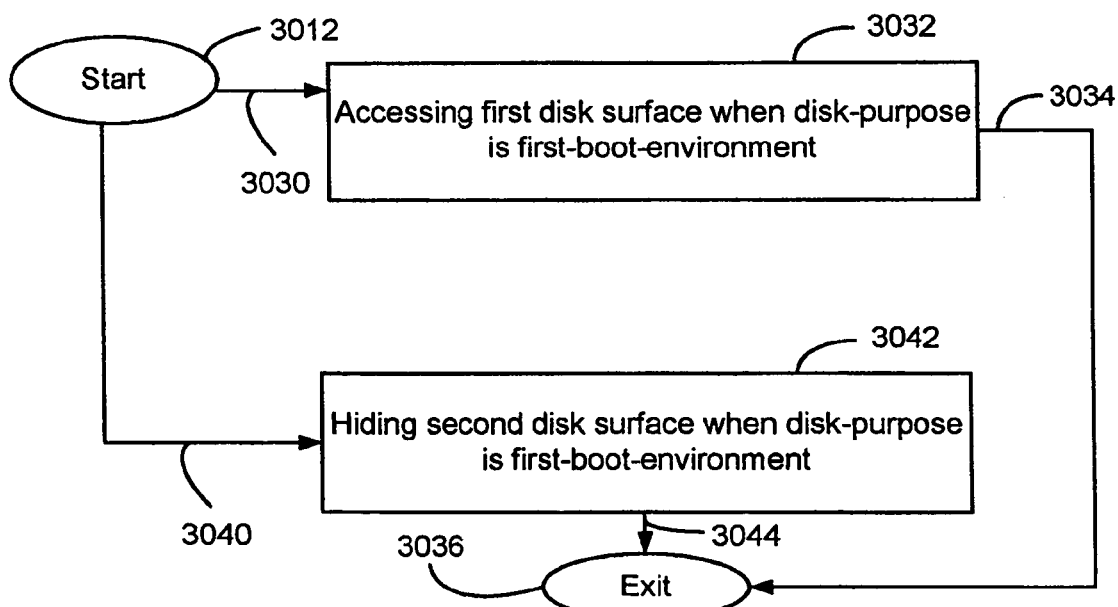
FIG. 2B shows a detail flowchart of FIG. 2A.

FIG. 2B shows a detail flowchart of the operation 3012 of FIG. 2A supporting accessing the first disk surface 180 and hiding the second disk surface 182 when the disk-purpose 2500 is the first-boot-environment 2516. Operation 3032 supports accessing the first disk surface when the disk-purpose is the first-boot-environment. Operation 3042 supports hiding the second disk surface when the disk-purpose is the first-boot-environment.

Figure 3A:
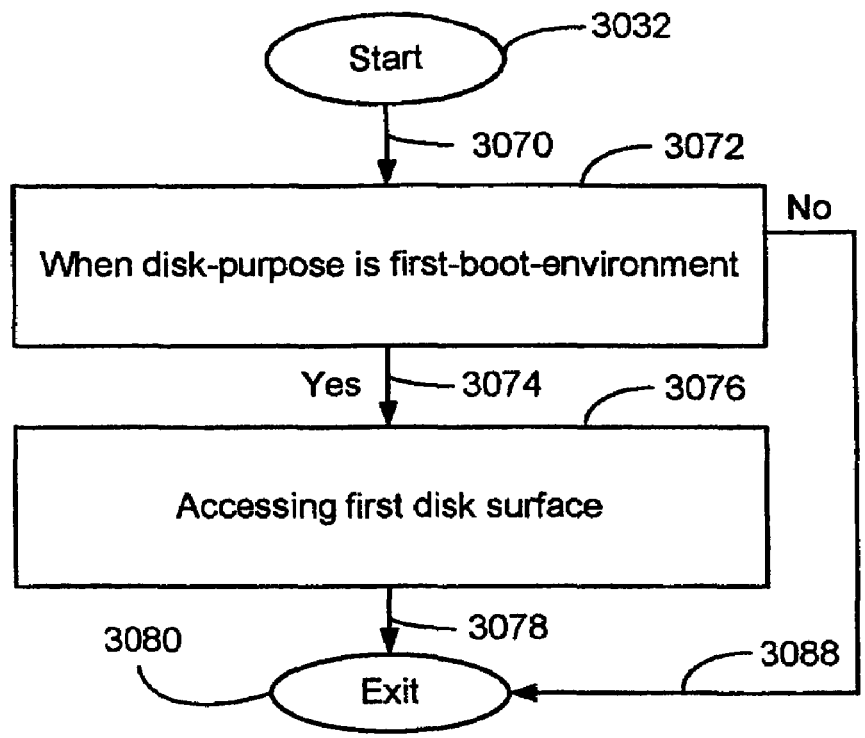
FIG. 3A shows a detail flowchart of FIG. 2B.
Figure 4A:
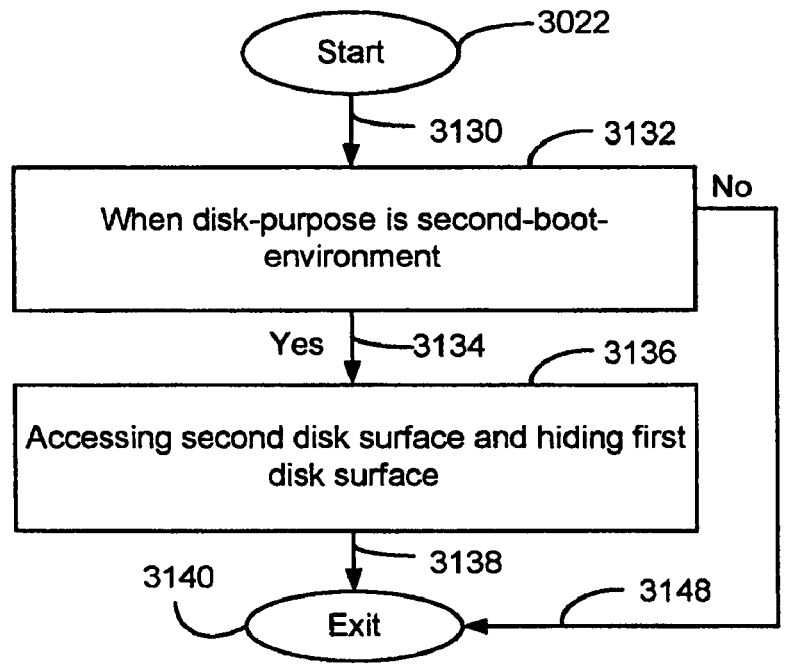
FIG. 4A shows a detail flowchart of FIG. 2A.
Figure 4B:
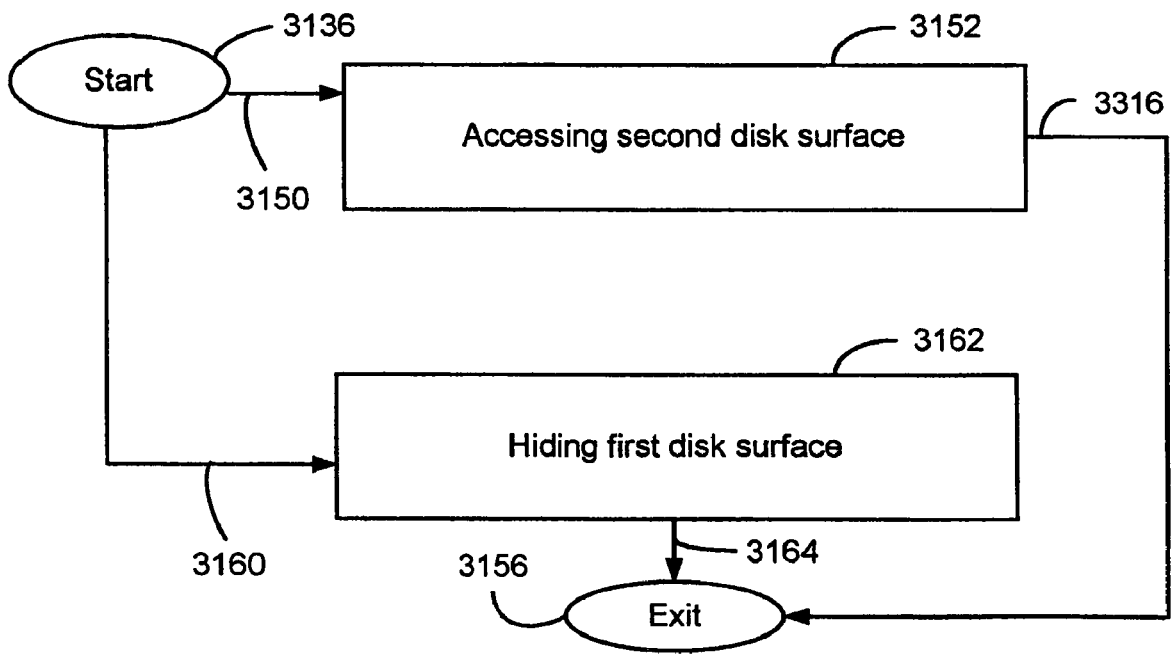
FIG. 4B shows a detail flowchart of FIG. 4A.

FIG. 3A shows a detail flowchart of operation 3032 of FIG. 2B further accessing the first disk surface 180 when the disk-purpose 2500 is the first-boot-environment 2516. Operation 3072 determines when the disk-purpose is the first-boot-environment, and when the determination 3074 is Yes, operation 3076 performs accessing the first disk surface.

Figure 3B:
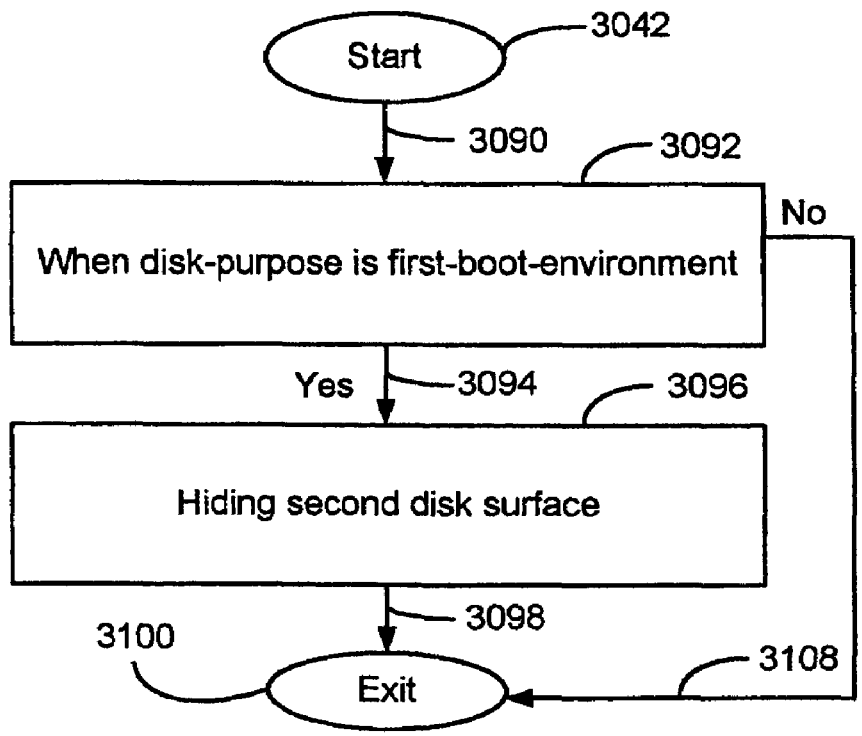
FIG. 3B shows a detail flowchart of FIG. 2B.

FIG. 3B shows a detail flowchart of operation 3042 of FIG. 2B further hiding the second disk surface 182 when the disk-purpose 2500 is a first-boot-environment 2516. Operation 3092 determines when the disk-purpose is the first-boot-environment, and when the determination 3094 is Yes, operation 3096 performs hiding the second disk surface.

FIG. 4A shows a detail flowchart of operation 3022 of FIG. 2A further accessing the second disk surface 182 and hiding the first disk surface 180 when the disk-purpose 2500 is the second-boot-environment 2518. Operation 3132 determines when the disk-purpose is the second-boot-environment, and when the determination 3134 is Yes, operation 3136 performs accessing the second disk surface and hiding the first disk surface.

FIG. 4B shows a detail flowchart of operation 3136 of FIG. 4A further accessing the second disk surface 182 and hiding the first disk surface 180. Operation 3152 supports accessing the second disk surface, and operation 3162 supports hiding the first disk surface.

Figure 5A:
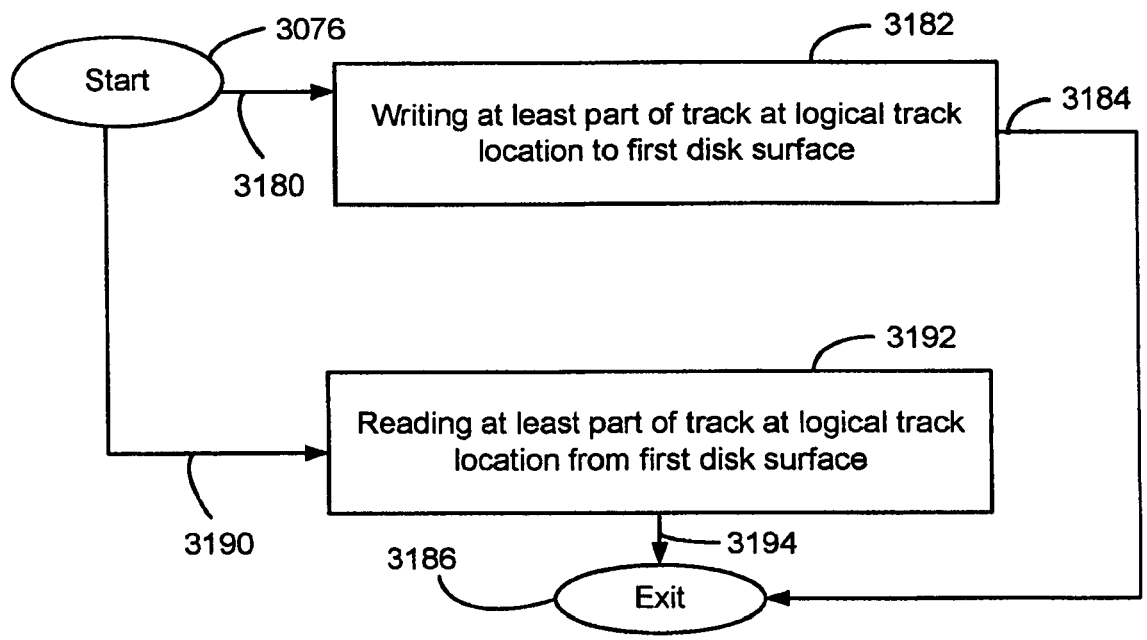
FIG. 5A shows a detail flowchart of FIG. 3A.

FIG. 5A shows a detail flowchart of operation 3076 of FIG. 3A further accessing the first disk surface 180. Operation 3182 supports writing at least part of the track 2532 at the logical track location 2530 to the first disk surface. Operation 3192 supports reading at least part of the track at the logical track location from the first disk surface.

Figure 5B:
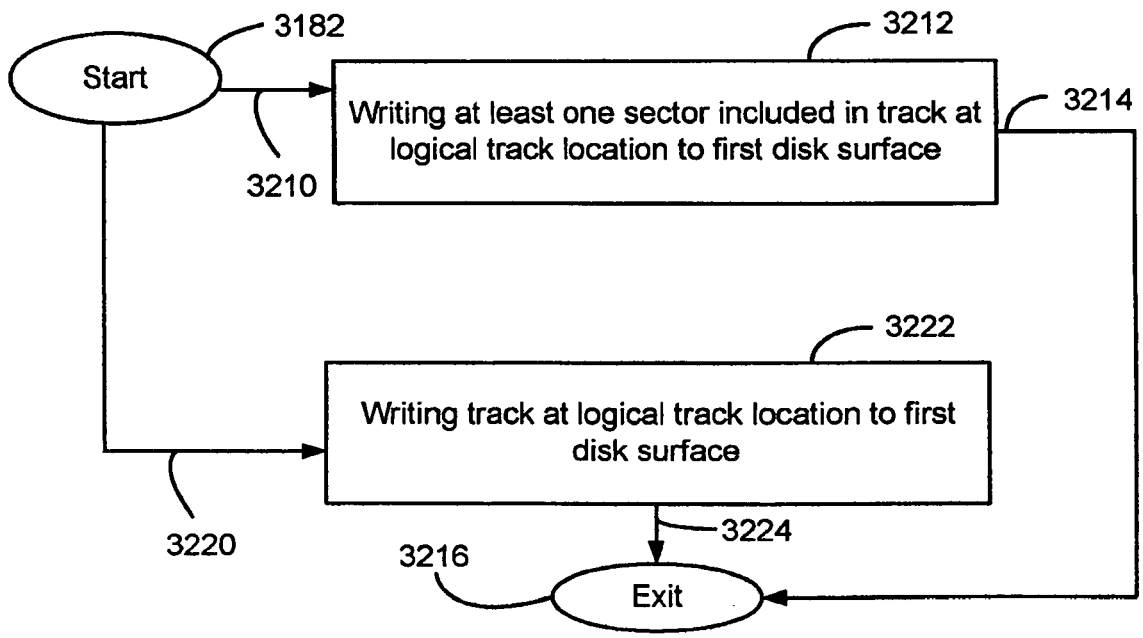
FIG. 5B shows a detail flowchart of FIG. 5A.

FIG. 5B shows a detail flowchart of operation 3182 of FIG. 5A further writing at least part of the track 2532 at the logical track location 2530 to the first disk surface 180. Operation 3212 supports writing at least one sector 2536 included in the track at the logical track location to the first disk surface. Operation 3222 supports writing the track at the logical track location to the first disk surface.

Figure 6A:
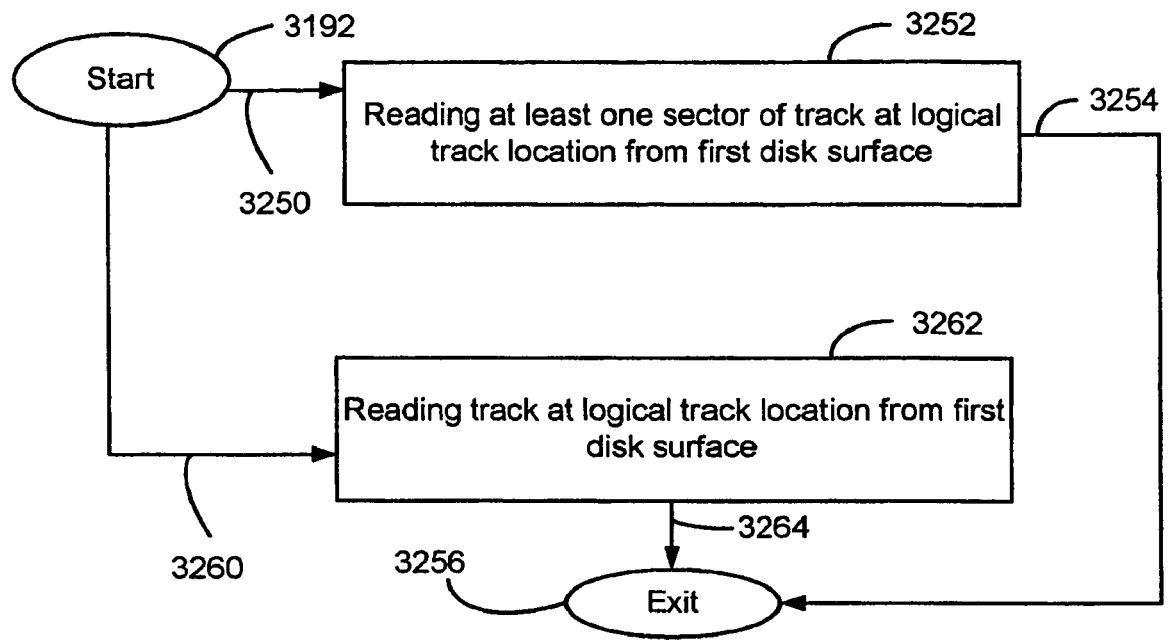
FIG. 6A shows a detail flowchart of FIG. 5A.

FIG. 6A shows a detail flowchart of operation 3192 of FIG. 5A further reading at least part of the track 2532 at the logical track location 2530 from the first disk surface 180. Operation 3252 supports reading at least one sector 2536 included in the track at the logical track location from the first disk surface. Operation 3262 supports reading the track at the logical track location from the first disk surface.

In certain embodiments, the embedded printed circuit board 2000 of FIG. 1A may not include micro-actuator interfaces 2010 and the first head gimbal assembly 60 may not include the micro-actuator assembly 200. When present, the micro-actuator assembly 200 may use at least one piezoelectric device and/or at least one electrostatic device.

The memory 2120 of FIG. 1A may include at least one non-volatile memory location. This memory may include at least one volatile memory location. A memory location is non-volatile when its contents are not altered when there is no power applied to the memory and is volatile when its contents may be altered when there is no power.

In FIG. 1B, the first actuator arm 50 couples to the first head gimbal assembly 60. The first head gimbal assembly includes the first slider 100, shown in FIGS. 1A and 1B, which includes the read-write head 10. This read-write head accesses the first disk surface 180.

Also in FIG. 1B, the second actuator arm 52 couples with the second head gimbal assembly 62 and also couples with the third head gimbal assembly 64. The second head gimbal assembly includes the second slider 102, which includes the second read-write head 12. The second read-write head accesses the second disk surface 182. The third head gimbal assembly includes the third slider 104, which includes the third read-write head 14. The third read-write head accesses the third disk surface 184.

Also in FIG. 1B, the third actuator arm 54 couples with the fourth head gimbal assembly 66 and also couples with the fifth head gimbal assembly 68. The fourth head gimbal assembly includes the fourth slider 106, which includes the fourth read-write head 16. The fourth read-write head accesses the fourth disk surface 186. The fifth head gimbal assembly includes the fifth slider 108, which includes the fifth read-write head 18. The fifth read-write head accesses the fifth disk surface 188.

Also in FIG. 1B, the fourth actuator arm 54 couples with the sixth head gimbal assembly 70 and also couples with the seventh head gimbal assembly 72. The sixth head gimbal assembly includes the sixth slider 110, which includes the sixth read-write head 20. The sixth read-write head accesses the sixth disk surface 190. The seventh head gimbal assembly includes the seventh slider 112, which includes the seventh read-write head 22. The seventh read-write head accesses the seventh disk surface 192.

Also in FIG. 1B, the fifth actuator arm 58 couples with the eighth head gimbal assembly 74. The eighth head gimbal assembly includes the eighth slider 114, which includes the eighth read-write head 24. The eighth read-write head accesses the eighth disk surface 194.

Figure 6B:
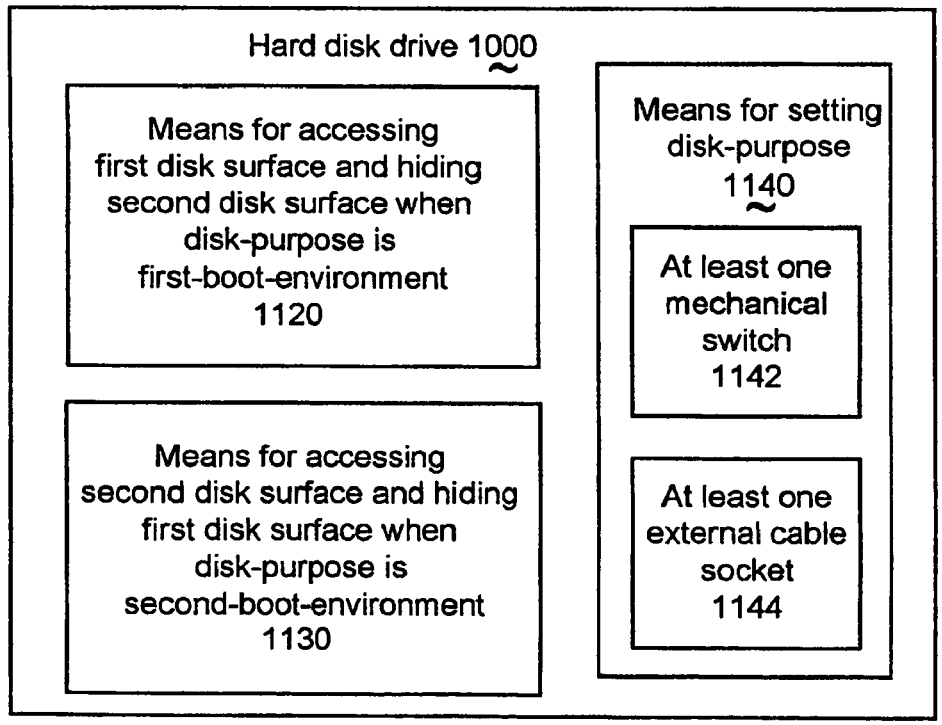
FIG. 6B shows an alternative schematic view of the hard disk drive of FIGS. 1A and 1B.

FIG. 6B shows an alternative schematic view of the hard disk drive 1000 of FIGS. 1A and 1B, including the following. A means 1120 for accessing the first disk surface 180 and hiding the second disk surface 182 when the disk-purpose 2500 is the first-boot-environment 2516. And a means 1130 for accessing the second disk surface and hiding the first disk surface when the disk-purpose is the second-boot-environment 2518.

In certain aspects of the invention, at least one of the means of FIG. 6B includes at least one of following. A finite state machine, a computer, a program step residing in the memory 2120 accessibly coupled 2122 with the computer 2100, and a program system 3000 including at least one of the program steps.

The hard disk drive 1000 may include a means for setting 1140 the disk-purpose 2500, as shown in FIG. 6B. The means for setting may include, but is not limited to, at least one mechanical switch 1142, and/or at least one external cable socket 1144.

Figure 7A:
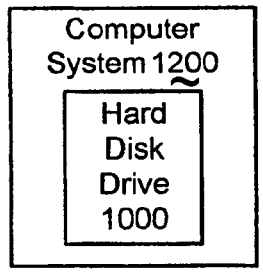
FIGS. 7A to 7H show examples of computer systems including the invention's hard disk drive.
Figure 7B:
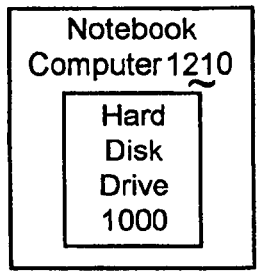
Figure 7C:
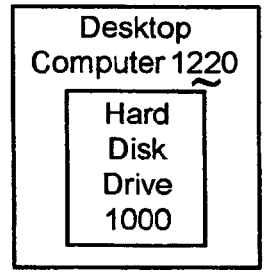
Figure 7D:
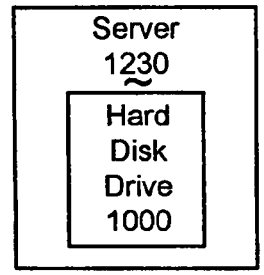
Figure 7E:
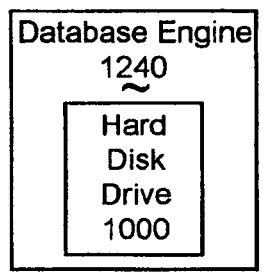
Figure 7F:
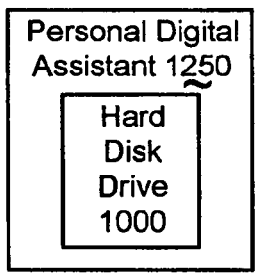
Figure 7G:
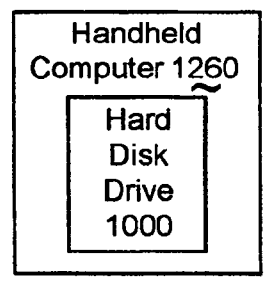
Figure 7H:
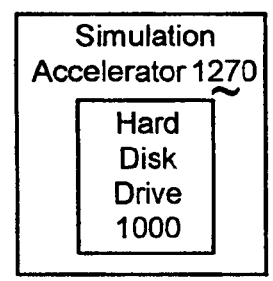

This invention includes a computer system, which includes the hard disk drive discussed in the preceding Figures. Some examples are shown in FIGS. 7A to 7H. FIG. 7A shows the computer system 1200 including the hard disk drive 1000. FIG. 7B shows a notebook computer 1210. FIG. 7C shows a desktop computer 1220. FIG. 7D shows a server 1230. FIG. 7E shows a database engine 1240. FIG. 7F shows a personal digital assistant 1250. FIG. 7G shows a handheld computer 1260. FIG. 7H shows a simulation accelerator 1270. The computer system 1200 may include more than one hard disk drive.

Figure 7I:
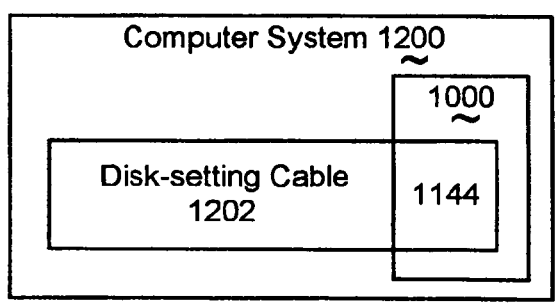
FIG. 7I further shows the computer system of FIG. 7A.

FIG. 7I shows the computer system 1200 of FIG. 7A further including a disk-setting cable 1202 coupled to the external cable socket 1144 of FIG. 6B. The disk-setting cable is preferably used, at least partly, to set the disk-purpose. Further, the disk-setting cable may be used to set the disk-purpose to at least one of the following, the first-boot-environment 2516 and the second-boot-environment 2518.

Figure 7J:
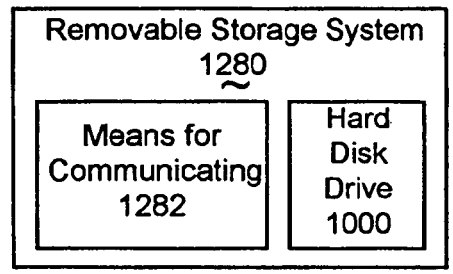
FIG. 7J shows a removable storage system, including the invention's hard disk drive.

FIG. 7J shows the invention also including a removable storage system 1280, comprising at least one hard disk drive 1000. The removable storage system may further, preferably, include at least one means for communicating 1282 with a computer system via a physical transport. The physical transport may include at least one of a wireless physical transport and/or at least one wireline physical transport. The wireless physical transport may include support for a Bluetooth interface. The wireline physical transport includes support for at least one of the following: a PCMCIA (Personal Computer Memory Card International Association) interface and a USB (Universal Serial Buss) interface.

The operation and allocation of the hard disk drive involving other than two or four disk surfaces (three, five, six, and so on) proceeds similarly to these examples. Various allocations may have the same number of disk surfaces allocated to the boot environments as shown in Tables 1 to 3. Various allocations may have the same number of disk surfaces allocated to the boot environments as shown in Table 4. The ordering of the allocations may vary from one embodiment to another as shown in Tables 2 and 3. The invention includes embodiments supporting more than two boot environments similar to the examples presented herein. The one or more disk surfaces allocated to a boot environment are accessible only when the disk-purpose is set to that boot environment, otherwise they are hidden from the computer system using the hard disk drive.

In many embodiments, changing the disk-purpose 2500 occurs either during, or shortly before, rebooting and/or starting up the computer system 1200 using the hard disk drive 1000. The computer system, in accessing the allocated disk surfaces of the boot environment, accesses the programs, data, and file structures of the operating system present in that boot environment. These accessed programs, data, and file structures initialize the computer system to execute the operating system of that boot environment.

This invention includes making the hard disk drive, and the product of that process. The invention includes computer systems including at least one of these hard disk drives. The invention also includes removable storage systems which include at least one hard disk drive, and which may communicate via a wireline and/or wireless physical transport with a computer system.

Making the hard disk drive 1000 includes installing the program system 3000 of FIGS. 1A, and 2A to 6A, specifically its program steps, in the memory 2120. The hard disk drive resulting from the installation is a product of this manufacturing process. Installing the program system is an example of installing the means 1120 and 1130 of FIG. 6B, which is another, essentially equivalent, method of making the hard disk drive.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method comprising the step of:
   providing by a hard disk drive a first-boot-environment and a second-boot-environment using a first disk surface and a second of said disk surfaces based upon a disk-purpose, both of said disk surfaces and said disk-purpose included in said hard disk drive, comprising the steps of:
   accessing by said hard disk drive said first disk surface and hiding said second disk surface when said disk-purpose is a first-boot-environment, further comprising the steps of:
     accessing a track at a logical track location on said first disk surface; and
     hiding said second disk surface; and
   accessing by said hard disk drive said second disk surface and hiding said first disk surface when said disk-purpose is a second-boot-environment, further comprising the steps of:
     accessing said track at said logical track location on said second disk surface; and
     hiding said first disk surface.

2. The method of claim 1, wherein the step of accessing said track at said logical track location on said first disk surface, further comprises the steps of:
   writing said track at said logical track location to said first disk surface; and
   reading said track at said logical track location from said first disk surface.

3. The method of claim 1, wherein the step of accessing said track at said logical track location on said second disk surface, further comprises the steps of:
   writing said track at said logical track location to said second disk surface; and
   reading said track at said logical track location from said second disk surface.

4. The hard disk drive, comprising:
   a disk-purpose;
   means for accessing a first disk surface and hiding a second disk surface when said disk-purpose is a first-boot-environment, further comprising
     means for accessing a track at a logical track location on said first disk surface; and
     means for hiding said second disk surface; and
   means for accessing said second disk surface and hiding said first disk surface when said disk-purpose is a second-boot-environment, further comprising
     means for accessing said track at said logical track location on said second disk surface; and
     means for hiding said first disk surface.

5. The hard disk drive of claim 4, wherein at least one of said means includes at least one of: a finite state machine, a computer, a program step residing in a memory accessibly coupled with said computer, and a program system including at least one of said program steps;
   wherein said computer includes at least one instruction processor and at least one data processor; wherein each said data processors is directed by at least one of said instruction processors.

6. The hard disk drive of claim 5,
   wherein said program system comprises the program steps of;
   accessing said first disk surface and hiding said second disk surface when said disk-purpose is said first-boot-environment; and
   accessing said second disk surface and hiding said first disk surface when said disk-purpose is said second-boot-environment.

7. The hard disk drive of claim 6, wherein said memory includes at least one non-volatile memory location.

8. The hard disk drive of claim 4, further comprising a means for setting said disk-purpose.

9. The hard disk drive of claim 8, wherein said means for setting said disk-purpose includes at least one mechanical switch.

10. The hard disk drive of claim 8, wherein said means for setting said disk-purpose includes at least one external cable socket.

11. A computer system including at least one hard disk drive comprising:
   a disk-purpose;
   means for accessing a first disk surface and hiding a second disk surface when e said disk-purpose is a first-boot-environment, further comprising:
     means for accessing a track at a logical track location on said first disk surface; and
     means for hiding said second disk surface; and
   means for accessing said second disk surface and hiding said first disk surface when said disk-purpose is a second-boot-environment, further comprising
     means for accessing said track at said logical track location on said second disk surface; and
     means for hiding said first disk surface.

12. The computer system of claim 11, wherein said computer system includes at least one of a notebook computer, a desktop computer, a server, a database engine, a personal digital assistant, a handheld computer, and a simulation accelerator.

13. The computer system of claim 11, further including a disk-setting cable coupled to an external cable socket included in said hard disk drive; wherein said disk-setting cable is used to at least partly set said disk-purpose.

14. The computer system of claim 13, wherein said disk-setting cable is used to set said disk-purpose to include one of said first-boot-environment, and said second-boot-environment.

15. A removable storage system including at least one hard disk drive comprising:

a disk-purpose;

means for accessing a first disk surface and hiding a second disk surface when said disk-purpose is a first-boot-environment, further comprising:

means for accessing a track at a logical track location on said first disk surface; and means for hiding said second disk surface; and means for accessing said second disk surface and hiding said first disk surface when said disk-purpose is a second-boot-environment, further comprising means for accessing said track at said logical track location on said second disk surface; and means for hiding said first disk surface.

16. The removable storage system of claim 15, further including at least one means for communicating with a computing system via a physical transport.

17. The removable storage system of claim 16, wherein said physical transport includes at least one of a wireless physical transport and a wireline physical transport.

18. The removable storage system of claim 17, wherein said wireless physical transport includes support for a Bluetooth interface; and wherein said wireless physical transport includes support for at least one of a PCMCIA interface and a USB interface.

\* \* \* \* \*